(12) United States Patent
Edlund et al.

(10) Patent No.: US 7,058,668 B2
(45) Date of Patent: Jun. 6, 2006

(54) SYSTEM FOR ESTIMATING THE TEMPORAL VALIDITY OF LOCATION REPORTS THROUGH PATTERN ANALYSIS

(75) Inventors: Stefan B. Edlund, San Jose, CA (US); Jussi Petri Myllymaki, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 652 days.

(21) Appl. No.: 10/042,366

(22) Filed: Jan. 11, 2002

(65) Prior Publication Data

US 2003/0135486 A1    Jul. 17, 2003

(51) Int. Cl.
*G06F 17/30* (2006.01)
(52) U.S. Cl. .................. 707/203; 707/201; 707/200
(58) Field of Classification Search ......... 707/1–104.1; 709/207; 342/457, 463; 702/179
See application file for complete search history.

(56) References Cited

U.S. PATENT DOCUMENTS

| | | | |
|---|---|---|---|
| 6,195,622 B1* | 2/2001 | Altschuler et al. | 703/2 |
| 6,603,428 B1* | 8/2003 | Stilp | 342/457 |
| 6,873,290 B1* | 3/2005 | Anderson et al. | 342/457 |
| 2002/0087649 A1* | 7/2002 | Horvitz | 709/207 |

\* cited by examiner

*Primary Examiner*—Jeffrey Gaffin
*Assistant Examiner*—Neveen Abel-Jalil
(74) *Attorney, Agent, or Firm*—Lacasse & Associates, LLC; Randy W. Lacasse; Ramraj Soundararajan (57) ABSTRACT

Analysis of a history of previous location reports received from a tracked entity is performed and this analysis is utilized to estimate the relevance of future location reports over time. This is accomplished via associating a computed expiration time with each location report, wherein this expiration time is used by an application to estimate the relevance degradation of a location report over time. Thus, the expiration time value acts as a threshold that controls the shape of a relevance degradation curve of a location report.

15 Claims, 10 Drawing Sheets

| Report Number | Δt {WORK} |
|---|---|
| 1 | 80 |
| 2 | 10 |
| 3 | 10 |
| 4 | 10 |
| 5 | 28,040 |
| 6 | 10 |
| 7 | 10 |
| 8 | 10 |

FIGURE 3A

| Report Number | Δt {HOME} |
|---|---|
| 1 | 10 |
| 2 | 10 |
| 3 | 10 |
| 4 | 80 |
| 5 | 10 |
| 6 | 10 |
| 7 | 56,750 |

SYSTEM FOR ESTIMATING THE TEMPORAL VALIDITY OF LOCATION REPORTS THROUGH PATTERN ANALYSIS

BACKGROUND OF THE INVENTION

1. Field of Invention

The present invention relates generally to the field of clustering and pattern analysis. More specifically, the present invention is related to the estimation of temporal validity associated with location reports through pattern analysis.

2. Discussion of Prior Art

Location based services and applications are becoming increasingly popular. The utility of a location tracking application is limited by the accuracy of the tracking information entered into the system. While the accuracy of the location tracking reports have greatly increased (particularly since the U.S. government decided to cease the deliberate GPS signal degradation for civilians), the position of a tracked individual at any given point in time can still be inaccurate due to the fact that position reporting modules are not always activated. For instance, a GPS module requires an unobstructed view of the four reference satellites and won't work inside buildings. Location reporting modules mounted inside vehicles only report the position while the vehicle is moving. Positioning modules using land-based navigation through triangulation and radio antennas have a limited area of coverage.

Figure 1:
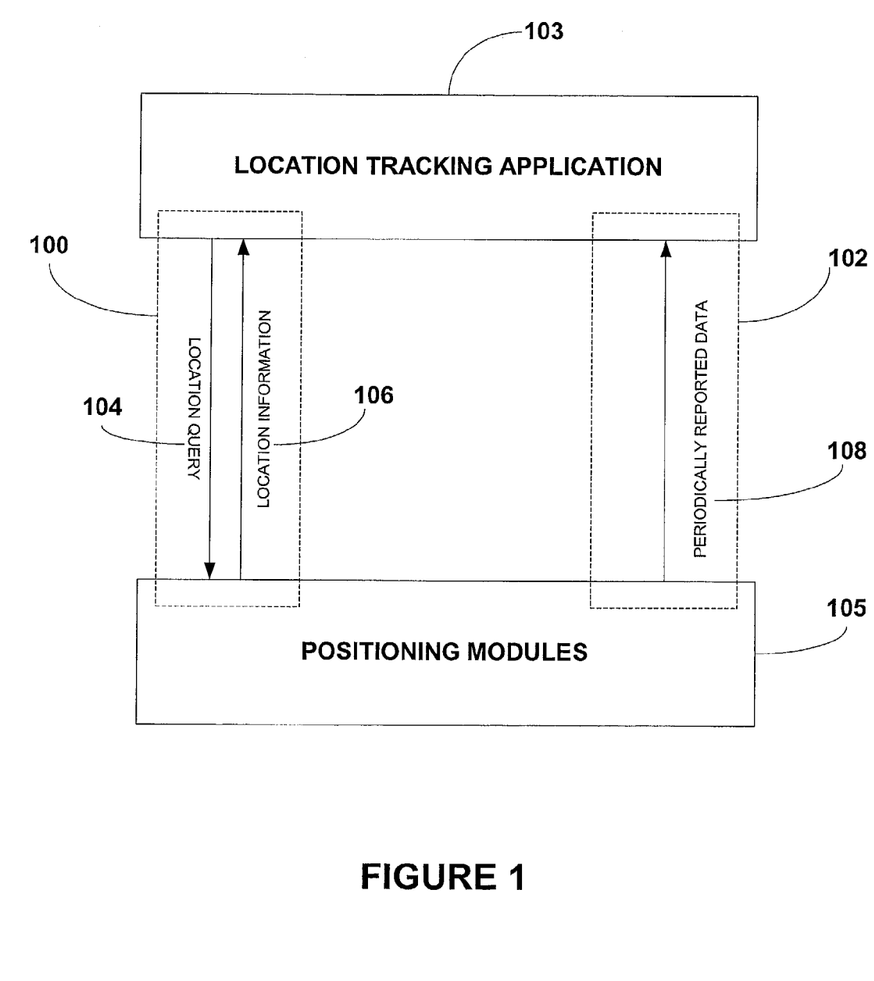
FIG. 1 illustrates the two modes associated with the reception/transmission of location related information.

FIG. 1 illustrates the two modes associated with the reception/transmission of location related information. A location tracking application receives position related information via a "pull" 100 or a "push" 202 mode. A brief discussion of each of these modes is given below:

1. PULL: Pulling is performed by the application if the positioning modules can be remotely queried for location information at any point in time. Whenever an application 103 requires location data, queries 104 are performed on-the-fly, wherein the positioning modules 105 provide for the most up-to-date location information 106. However, because of the additional complexity and cost associated with such designs, few systems exist on the market.
2. PUSH: The far most common location reporting technique is to have the positioning modules 105 periodically report their position 108 to the application 103. Several different techniques can be used to report these positions. Some examples include of such techniques include remote method invocation (RMI), Simple Object Access Protocol (SOAP), Transmission Control Protocol (TCP), User Datagram Protocol (UDP) sockets, or email. The downside of "pushing" location data is that location information stored in the application 103 does not represent the real-time position of the tracked entity.

A problem associated with prior art location tracking systems is that they fail to analyze the history of previous location reports received from a tracked entity, and such systems fail to advantageously use this history to estimate the relevance of future reports over time. This type of analysis is particularly beneficial in the instance that the tracked entity's location is constant over certain intervals of time. Identification of such periods of inactivity is useful in preserving communication bandwidth, since the location tracking system that is aware of these periods of inactivity can stop requesting location information during these periods.

Whatever the precise merits, features and advantages of the above mentioned prior art systems, none of them achieve or fulfills the purposes of the present invention.

SUMMARY OF THE INVENTION

The present invention provides for a system and method for analyzing the history of previous location reports received from a tracked entity and uses the history to estimate the relevance of future reports over time. This is done by associating a computed expiration time with each report. For instance, a positioning module mounted inside a vehicle stops sending location reports in the morning when the driver arrives at work. The last report received from the vehicle (reporting the position somewhere near the work location) will have an expiration time of about 8 hours, or approximately the time the person spends at work. Similarly, when the driver arrives at home the last report will be associated with an expiration time of about 10 hours, or approximately the time spent at home every night.

This expiration time is used by a tracking application to estimate the relevance degradation of a location report over time. A newly received location report has a high temporal relevance since it most accurately reflects the location of a tracked entity (device and user) at that point in time. However, as time passes, and if no further location reports are received, the last received location report becomes less relevant since it becomes increasingly likely that the tracked entity is no longer at the location indicated in that location report. Eventually, the expiration time passes and the location report has little relevance or is not relevant at all. The expiration time value is a threshold that controls the shape of the relevance degradation curve of a location report. Such an analysis of location reports can be used in increasing the confidence in the location of a tracked entity and triggering a tracking application upon exceeding an identified expiration time.

DESCRIPTION OF THE PREFERRED EMBODIMENTS

While this invention is illustrated and described in a preferred embodiment, the invention may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Figure 2:
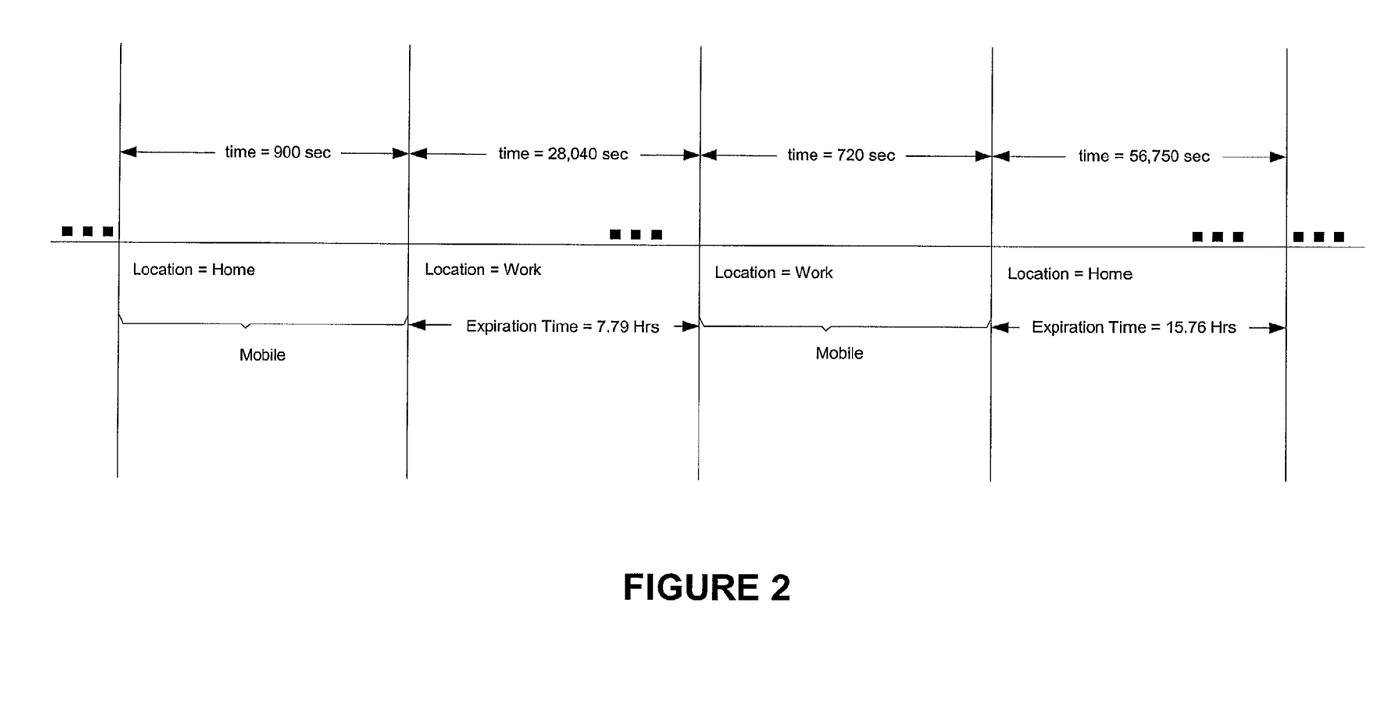
FIG. 2 illustrates a timeline example showing periods of inactivity.

The present invention provides for a location tracking system that analyzes the history of previous location reports received from a tracked entity and uses this history to estimate the relevance of future reports over time. The identification of periods of inactivity is particularly beneficial in preserving communication bandwidth since the location tracking system that is aware of these periods of inactivity can stop requesting location information during these periods. FIG. 2 illustrates a timeline showing an example of these periods of inactivity.

In this specific example, a tracked entity (e.g., a person in a car) leaves a first location (home) and is mobile for approximately 900 seconds (15 minutes) before arriving at a second location (work). Next, the tracked entity is idle for a period of 28,040 seconds (7.79 hours) at the second location (work), after which, the tracked entity is mobile again for about 720 seconds (12 minutes), leaving the second location (work) to return to the first location (home), where the tracked entity is idle for about 57,340 seconds (15.76 hours). This timeline of events is recorded again over additional time periods before an analysis of location data can be performed.

The present invention's system and method analyzes such location data, clusters such data into one or more categories, and identifies idle times associated with each of these clusters. Based upon this analysis, communication bandwidth is conserved by not pulling data from the positioning modules during these identified idle times. Furthermore, these identified idle times are associated with a threshold that dictates the degradation in the relevance of a location report over time.

The location tracking system (which, in one embodiment, is located on a server) of the present invention periodically receives tracking information from a number of tracked entities and stores such information in a database where historical records are maintained. The historical records or location data (latitude and longitude) for a single tracked entity is used as inputs to a clustering algorithm, which in turn associates each record with one out of N clusters (i.e., classification). The clustering of the data identifies location where the tracked entity is frequently visiting. There are several different techniques for clustering data and for selecting an optimal number of clusters N. When the data has been partitioned into clusters, a time interval analysis is performed on each cluster.

It should be noted that one skilled in the art can envision using various known or future optimization and clustering techniques in conjunction with the present invention without departing from the scope, and, therefore, such techniques should not be used to limit the scope of the present invention.

Returning to the example in FIG. 2 and looking at a time interval analysis of that data, gives us some insight into the basis of the present invention's system and method. The table for the time interval data (corresponding to FIG. 2) at home and at work is collectively shown in FIGS. 3a and 3b. The first column in each of these figures represents the location records. For example, in the case of the work cluster in FIG. 3a, there are 8 location records, and in the case of the home cluster in FIG. 3b, there are 7 location records. The second column in each of these figures represents the time interval $\Delta t$ between the two subsequent reports. The entries in column 2 with $\Delta t$ values of 10 seconds (report numbers 2,3,4,6,7,8 in FIG. 3a and report numbers 1,2,3,5,6 in FIG. 3b) correspond to the transmission of location related information every 10 seconds. The entries in column 2 with $\Delta t$ values of 80 seconds (report number 1 in FIG. 3a and report number 4 in FIG. 3b) correspond to the time taken to re-establish a lost connection. Report number 5 in FIG. 3a and report number 7 in FIG. 3b represent the most important $\Delta t$ values (28,040 and 56,750 seconds) as they represent the idle times associated with the tracked entity at work and at home.

Figure 3A:
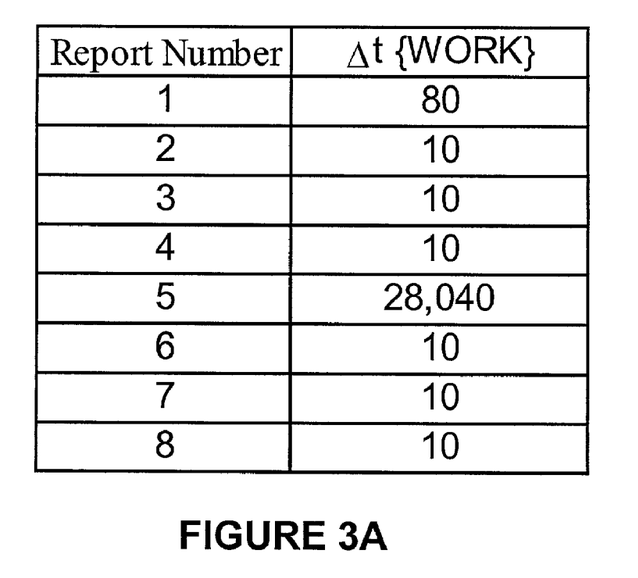
FIGS. 3a and 3b collectively illustrate a table with time interval data at work and at home corresponding to FIG. 2.
Figure 3B:
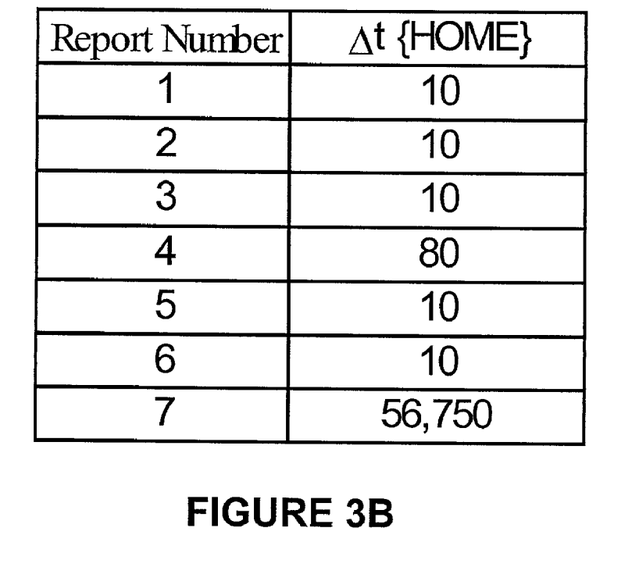
Figure 4A:
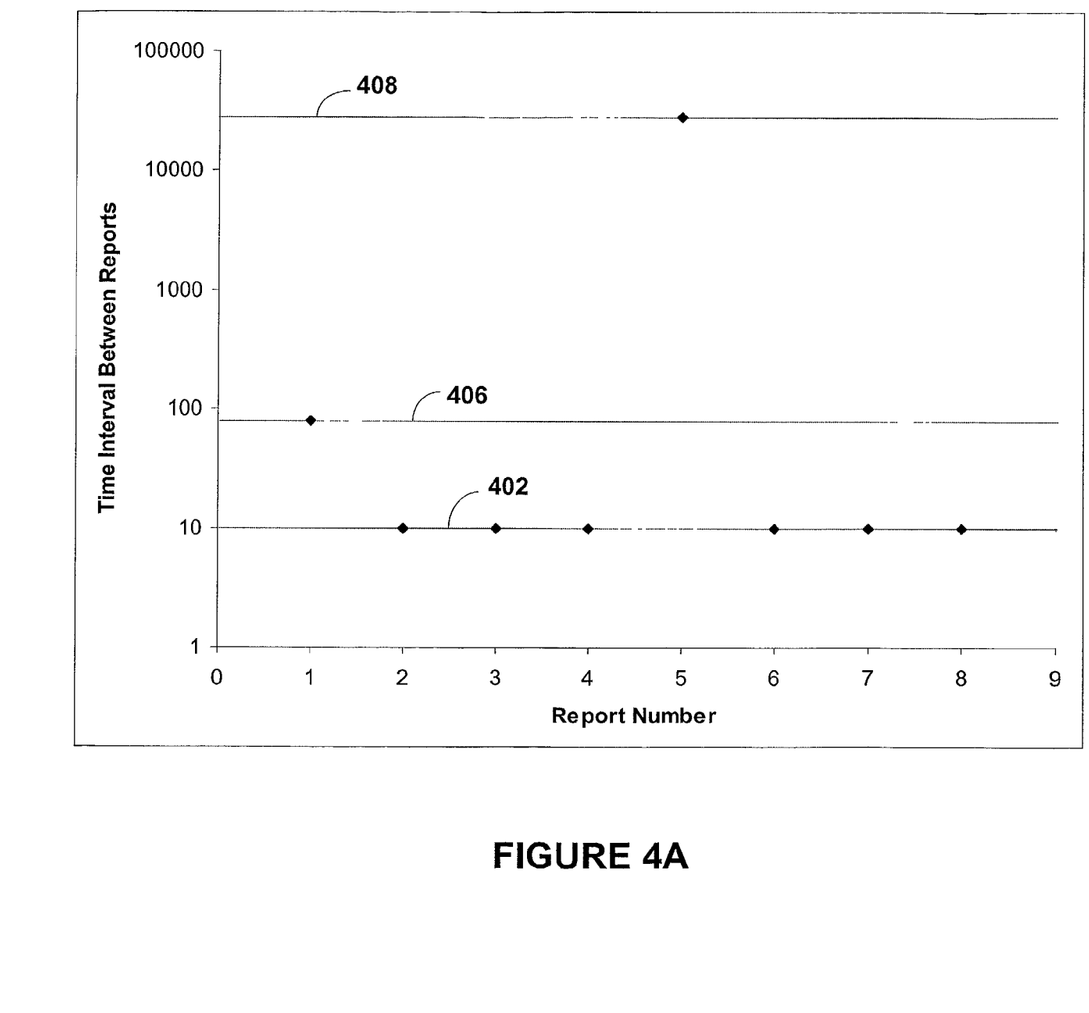
FIGS. 4a and 4b collectively illustrate a log time interval plot constructed with the data of the tables in FIGS. 3a and 3b.
Figure 4B:
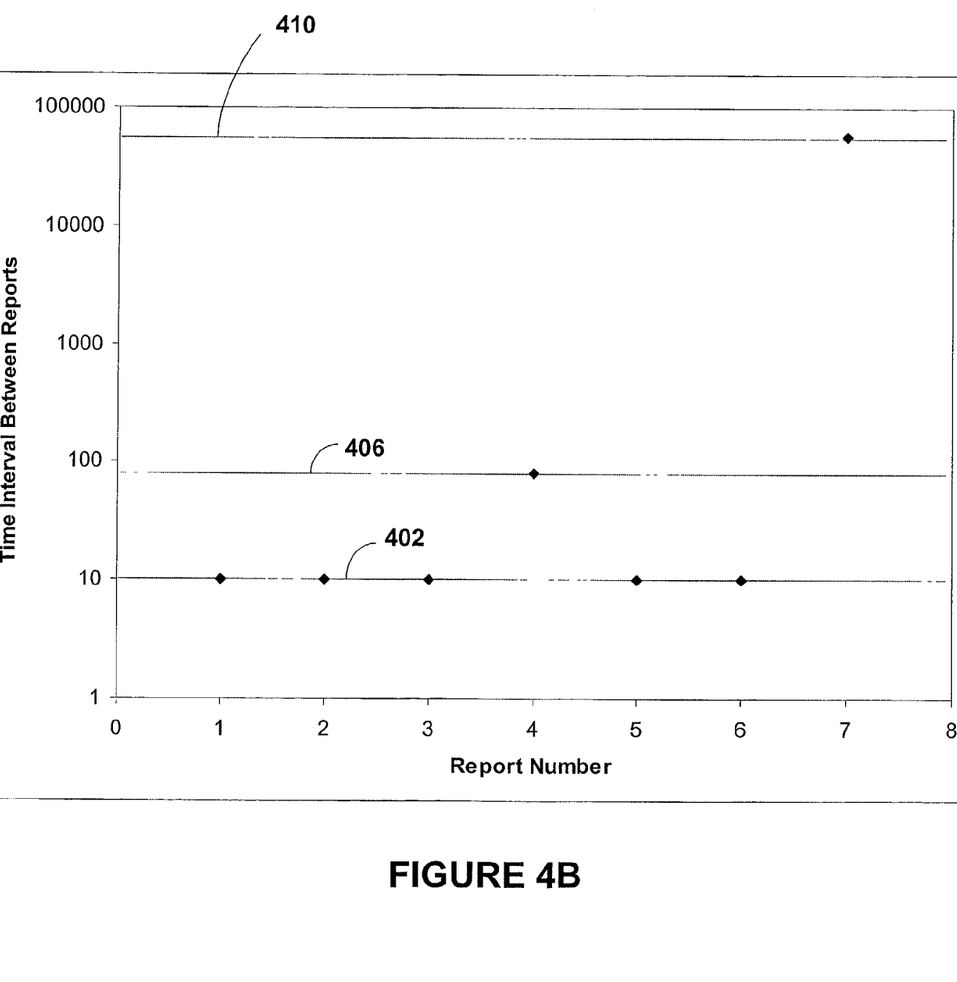

FIGS. 4a and 4b collectively illustrate the pattern analysis technique of the present invention, wherein a log time interval plot is constructed with the data given in the tables in FIGS. 3a and 3b. The x-axis of FIGS. 4a and 4b represents the location records and the y-axis represents time interval $\Delta t$. It should be seen from FIGS. 4a and 4b that there is a strong line representing the 10 second time interval 402, and this corresponds to the above-described transmission of location related information every 10 seconds. The next line 406, corresponding to the 80 second time interval, relates to the above-described reconnection time of 80 seconds. The line shown as 408 in FIG. 4a corresponds to the 28,040 second time interval that the tracked entity spends at work. Lastly, the line given by 410 in FIG. 4b corresponds to the 56,750 second time interval that the tracked entity spends at home.

Figure 5:
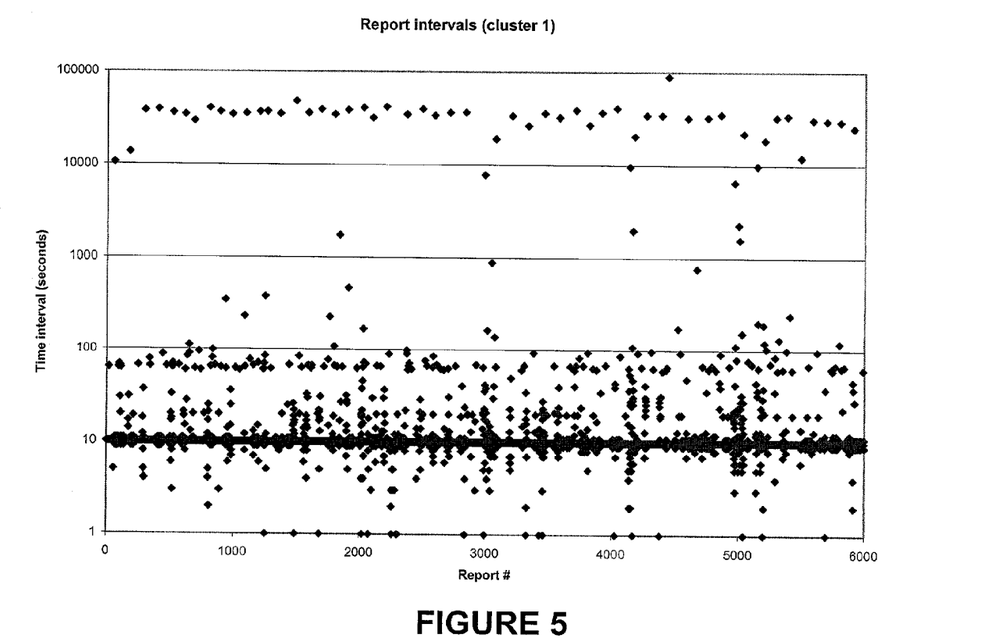
FIG. 5 illustrates a log interval plot of data representative of a longer time period.

It should be noted that although the two most important lines of interest (408 in FIGS. 4a and 410 in FIG. 4b) are represented by only one location record each (out of just 15 location records); this is due to the fact that location data were representative of a short time period. To better see the effect of the idle times on such graphs, location data representative of a longer time period are necessary, and such a graph is shown in FIG. 5. It should be noted that the plots in FIGS. 4a and 4b are shown on a logarithmic scale to conveniently fit all the data points to a reasonable scale.

FIG. 5 illustrates another example of how a log interval plot looks for a particular cluster. This is actual data collected on one of the authors during the month of November 2000. In this graph, the vertical axis represents a logarithmic representation of the time interval between two subsequent reports within the same cluster, and the horizontal axis represents the location records (in this case there are about 6,000 historical records). Several horizontal lines are visible, the strongest one around the 10 second interval line. In this case, the positioning module is mounted in a car and it sends out reports every 10 seconds. Another strong line is around 80 seconds. This line is also associated with characteristics of the particular location reporting module; in this case it's the time taken to re-establish a lost connection. The third and upper-most line is the most important because it has nothing to do with the location reporting module itself. The line around the 50,000 second interval represents the average time the tracked entity is staying idle at the location represented by this particular cluster. This interval (about 14 hours) is defined as the expiration time of any location tracking record originating from this cluster. Methods for algorithmically finding this line are several, but, in essence, it is just another partitioning problem solved by fitting the 1-dimensional logarithmic interval data using a suitable clustering model. Any such method is covered by the scope of this patent.

Figure 6:
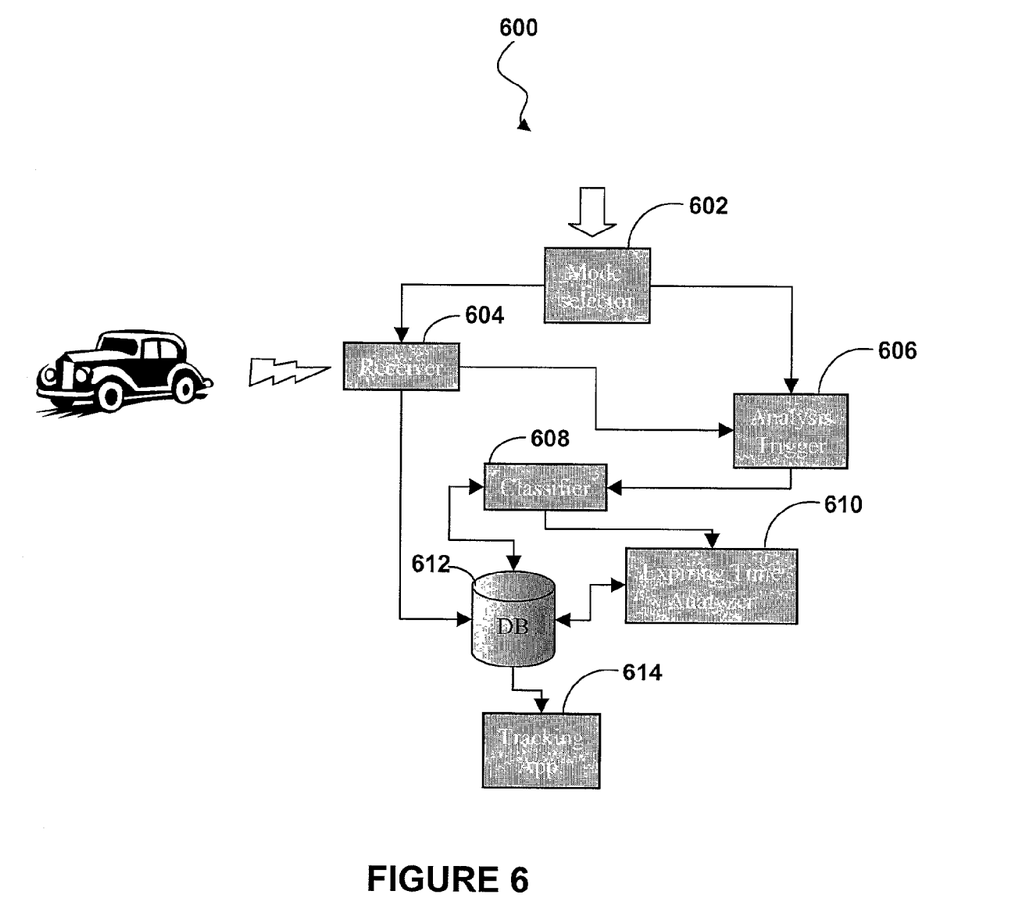
FIG. 6 illustrates the present invention's system for estimating the temporal validity of location reports through pattern analysis.

FIG. 6 illustrates the present invention's system 600 for estimating the temporal validity of location reports through pattern analysis. Each component of system 600 is described as follows:

1. Mode Selector: Analysis of data is performed using either an on-line mode, where information is analyzed immediately when it arrives, or a batch mode, where the system periodically performs the data analysis task. The user, through the mode selector component, specifies which mode is preferred. If batch mode is selected, the user enters the periodicity for data analysis tasks, e.g., every 24 hours. The receiver 604 and the analysis trigger component 606 are notified about the current mode being used.

2. Receiver: Tracking information arriving from several tracked entities is received by this component initially. The receiver 604 makes sure that each location record is stored in the database (DB) 612. If the system is running in on-line mode, the receiver also sends the new location information record to the analysis trigger component 606.

3. Analysis Trigger: Depending upon which mode is being used, this component triggers data analysis tasks. If on-line mode is in effect, the analysis trigger 606 receives new location tracking records from the receiver 604 when they arrive. The records are passed on to the classifier 608 and the expiration time analyzer 610 for further processing. If batch mode is in effect, the analysis trigger 606 periodically sends data analysis requests to the classifier 608 and the expiration time analyzer 610, e.g., every 24 hours.

4. Classifier: The classifier 608 clusters historical latitude, longitude data into N clusters (or partitions) for each tracked entity. The number N is algorithmically selected so that the partitioning of the data optimally represents N locations frequently visited. If the system is running in online mode, the classifier 608 receives a single location tracking record and repartitions the data given the new record. If batch mode is being used, the classifier 608 repartitions all records stored in the database on a request from the analysis trigger 606. In either case, the end-result is that a cluster membership label is appended to every location record in the database. When classification is completed, a notification is sent to the expiration time analyzer 610. When online mode is used, the classifier 608 also passes along an identifier for the tracked entity from whom the location record was received.

5. Expiration Time Analyzer: The component estimates expiration times for each partition computed by the classifier. If online mode is used, the expiration time analyzer 610 only computes expiration times for the tracked entity indicated by the classifier 608. In batch mode, the expiration time is recomputed for all tracked entities in the system. As discussed above, by analyzing the time intervals between subsequent location reports, and filtering out uninteresting intervals which can be associated with features of the particular positioning module (e.g., intervals less than say 1,000 seconds), an expiration time T is selected. Once T has been computed for a particular partition, each location reports in that partition is associated with T.

6. DB: This component contains location reports (both current and historical) for a number of tracked entities. A report can be as simple as a timestamp associated with longitude and latitude information, or more advanced schemas can be used. The invention also associates two additional features with the location reports: partitioning information and an expiration time indication.

7. Tracking Application: This is the application utilizing the location tracking information. By having access to expiration time information for location reports, the application 614 can improve the confidence in location information reported. For example, consider an application that receives location reports from two tracking devices that belong to the same tracked entity. Each tracking device submits location reports independently, and the system described here computes an expiration time automatically for reports received from those devices. Using the expiration time information, the application can choose to place more confidence in reports that don't expire for the longest time (i.e., expiration time is furthest in the future). The application 614 can also choose to ignore reports whose expiration time has already passed. An entirely different set of applications can be constructed by triggering events based on the expiration information. For instance, failure to receive an updated location report before the previous report expires is an indication that something may be wrong. Consider an application built for parents who like to be alerted when a location report from their child's tracking device expires and an update isn't received.

Thus, the invention can be used to increase the confidence for tracking information originating from any kind of location positioning module. Historical data contains patterns that are used to draw conclusions about the confidence of newly received reports. Applications benefit from the increased confidence levels and can utilize the expiration information to support additional software features.

It should be noted that the system described by the invention can also be integrated into the positioning module itself. This is the case in the preferred embodiment due to the fact that sensitive historical location data can be recorded locally on the device itself and not disclosed on a shared server. If the positioning module is running in "heart-beat" mode, e.g., periodically sending out location reports, the expiring time of the reports can be set to the heart-beat frequency except for the very last report before the module shuts down, which uses the derived expiring time computed as described above.

Further, it should be noted that the invention works both when the system is pulling information from positioning modules and when the positioning modules pushes information to the tracking system. When pulling is used and the positioning module isn't online, the tracking system falls back to the most recently retrieved location report and its associated expiration time. The expiration time can be used to trigger automatic refresh of the location data when the current report becomes invalid.

Figure 7:
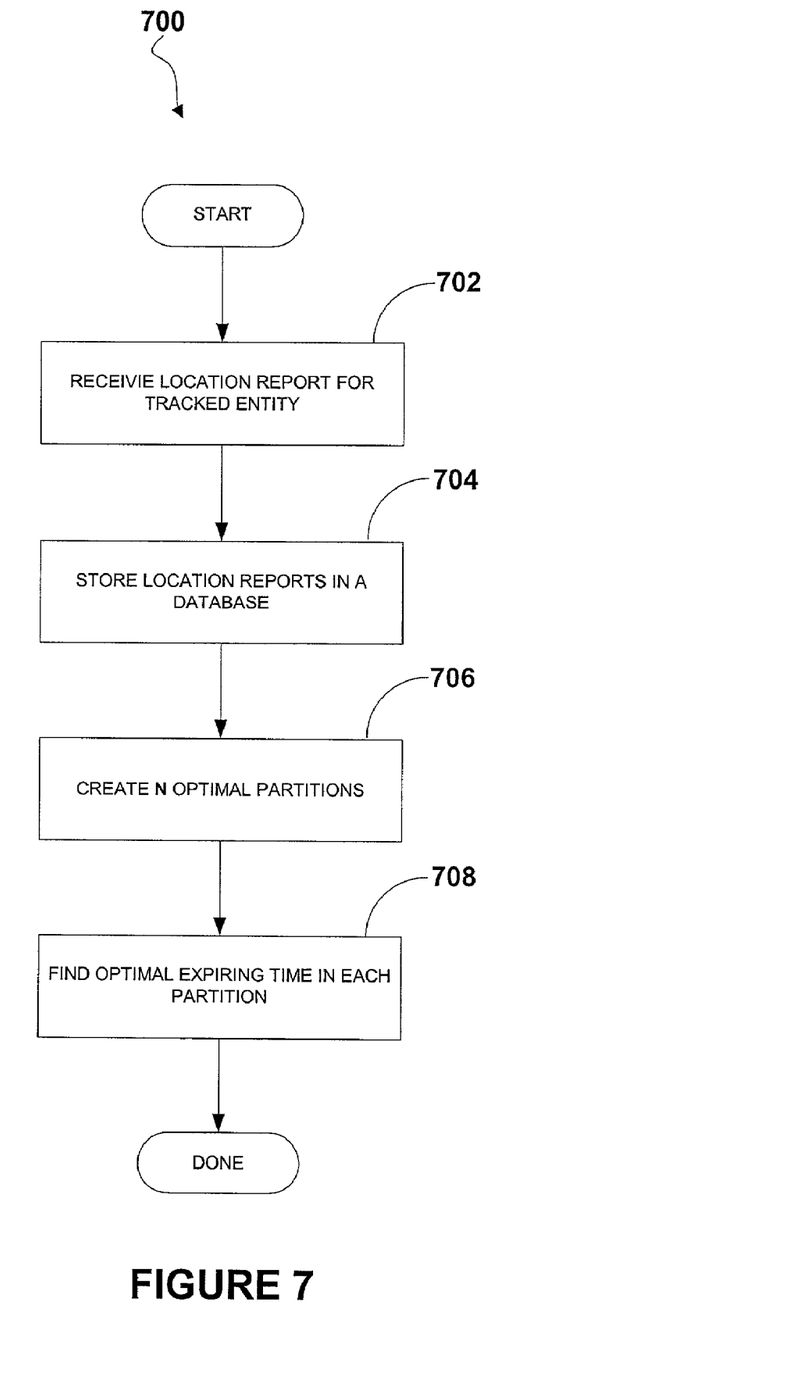
FIG. 7 illustrates the method of the present invention functioning in an online mode.
Figure 8:
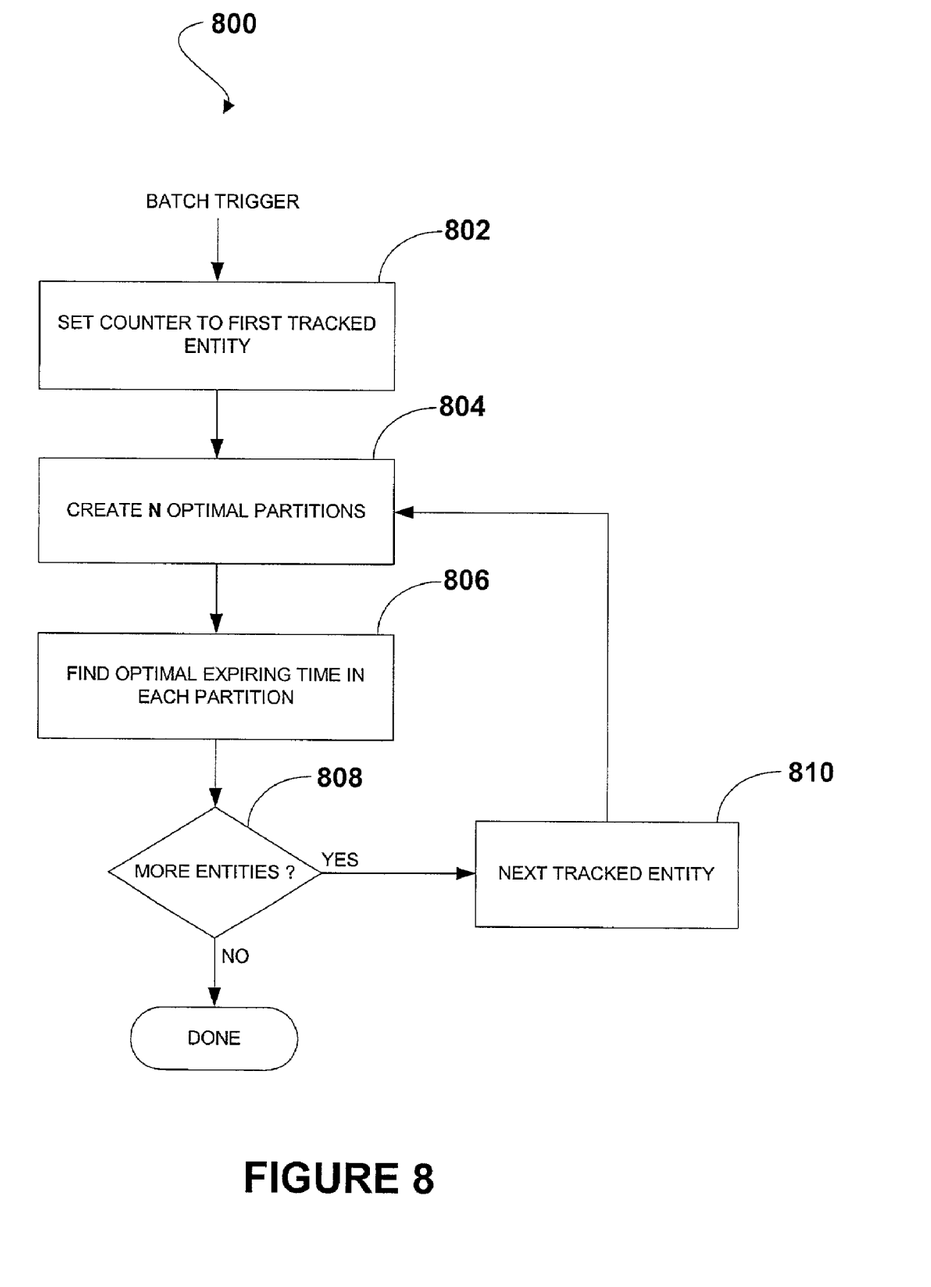
FIG. 8 illustrates the method of the present invention functioning in a batch mode.

The method of functionality associated with the system shown in FIG. 6 is collectively illustrated in FIGS. 7 and 8. FIG. 7 illustrates the method of the present invention functioning in an online mode. In this mode, a single location tracking record is received 702 and stored in a database 704. Next, the data is partitioned into N optimal partitions 706. Lastly, an optimal expiration time is calculated (via the time interval analysis method described above) for each partition 708, and this calculated expiration time is used to estimate the degradation of the relevance of a location report over time.

FIG. 8, on the other hand, illustrates the method 800 associated with the batch mode of the present invention, wherein data analysis tasks are performed periodically. In this mode, a batch trigger initiates the method, and location records corresponding to a first tracked entity are extracted. For the first tracked entity 802, corresponding location records are extracted and partitioned into N partitions 804. Next, an optimal expiration time is calculated (via the time interval analysis method described above) for each partition 806, and if more than one tracked entity exists 808, steps 804 through 808 are repeated with the next set of location records 810.

Figure 9:
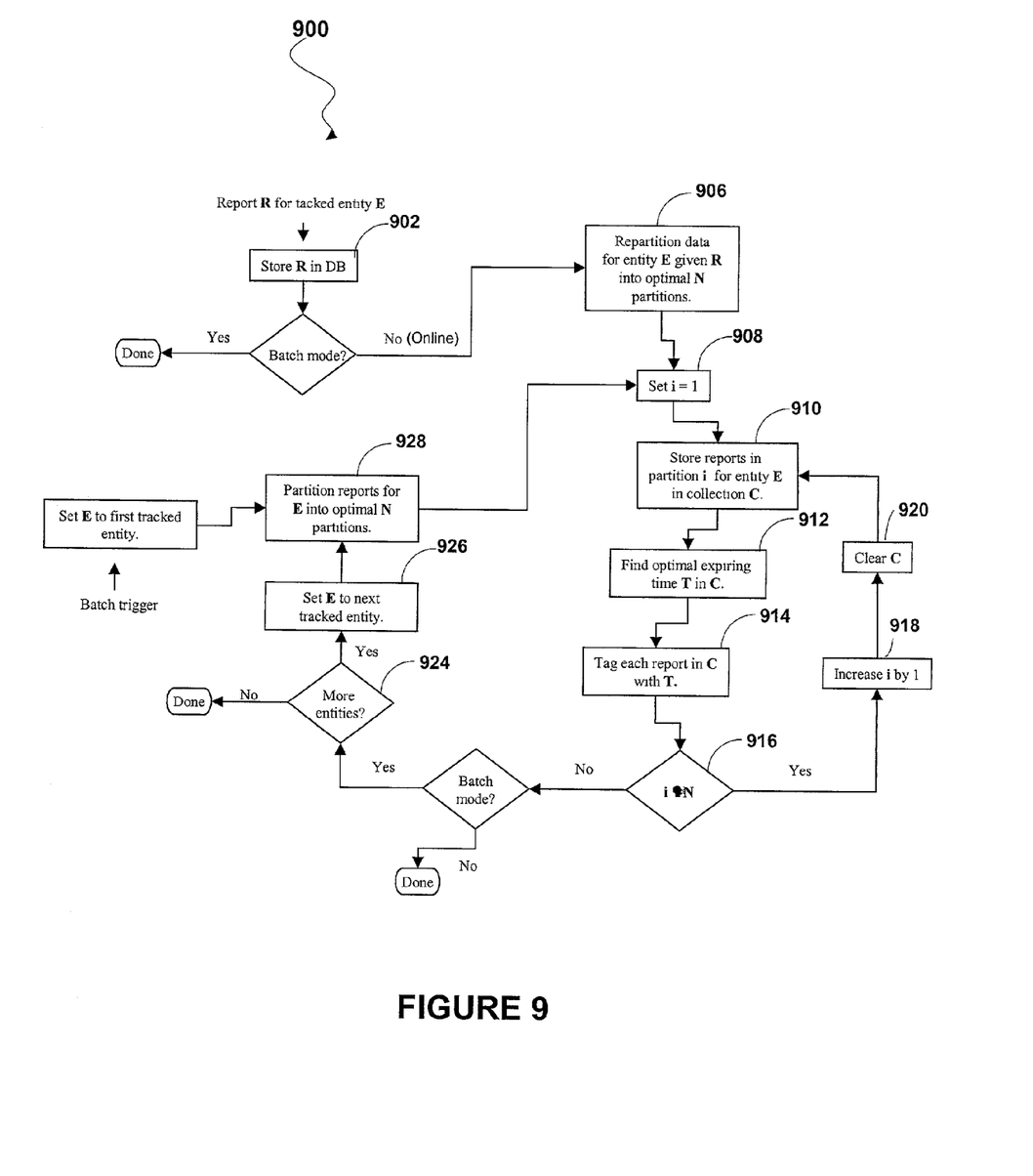
FIG. 9 illustrates an overall algorithmic perspective of the present invention's method for estimating the temporal validity of location reports through pattern analysis.

FIG. 9 illustrates an overall algorithmic perspective of the present invention's method for estimating the temporal validity of location reports through pattern analysis. The method 900 starts when a report R related to tracked entity E is received by the system of the present invention. The received information is stored in a database 902 (such as database 612 in FIG. 6).

Next, in an online mode, the location data is partitioned 906, for entity E given R, into optimal N partitions. A loop is then executed, from i=1 to N 908, wherein reports in partition i for entity E is stored in a collection C 910. As a next step, an optimal expiration time T is calculated 912 and tagged onto C 914. Then, a check is performed in step 916 to see if i<N, and if so, the counter i is increased by 1 918, and steps 910 through 916 are repeated after clearing C 920. Thus, in the online mode, the process continues until all the partitions have been associated with an optimal expiration time.

In a batch mode, a batch trigger initiates the method, and as a first step, E is set as the first tracked entity among one or more tracked entities. Next, reports are partitioned into N optimal partitions 928, and steps 908 through 916 in the online mode are executed. After looping steps 908 through 916, a check is performed in step 924 to see if more time interval analysis need to be performed on other tracked entities, and if so, E is set to the next tracked entity 926, and steps 928 through 924 are repeated until the method exhaustively partitions and identifies optimal expiration times associated with all partitions and all tracked entities.

In one embodiment, the present invention for location-based tracking is implemented in a SOAP-based architecture. Simple Object Access Protocol or SOAP provides a way for applications to communicate with each other over the Internet, independent of platform. Unlike OMG's IIOP, SOAP piggybacks a DOM onto HTTP (port 80) in order to penetrate server firewalls, which are usually configured to accept port 80 and port 21 (FTP) requests. SOAP relies on XML to define the format of the information and then adds the necessary HTTP headers to send it.

It should, however, be noted that although the SOAP protocol is used to illustrate a specific embodiment, one skilled in the art can envision using the present invention in conjunction with other protocols, and hence should not limit the scope of the present invention based upon the choice of protocols used.

Furthermore, the present invention includes a computer program code based product, which is a storage medium having program code stored therein, which can be used to instruct a computer to perform any of the methods associated with the present invention. The computer storage medium includes any of, but not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM or any other appropriate static or dynamic memory, or data storage devices.

Implemented in computer program code based products are software modules for: receiving and storing location related information for one or more tracked entities, creating N number of optimal partitions, identifying an expiration time (via time interval analysis) associated with each partition, and utilizing the identified time to estimate the relevance degradation of a location report over time.

CONCLUSION

A system and method has been shown in the above embodiments for the effective implementation of a system and method for estimating the temporal validity of location reports through pattern analysis. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment, specific computing hardware, clustering model, method for picking the optimal number of clusters, number of location records, number of clusters, or type of mode (online or batch mode).

The above enhancements are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of clustering algorithms and pattern analysis.

The invention claimed is:

1. A method for increasing confidence for tracking information originating from one or more location positioning modules, said method comprising:
   a. receiving location reports from said one or more location positioning modules;
   b. storing said location reports in one or more databases;
   c. creating N optimal partitions for location reports corresponding to each of said location positioning modules;
   d. identifying via pattern analysis an expiration time associated with each of said created partitions; said pattern analysis comprising identifying several frequent time intervals between location reports in a cluster using a logarithmic time interval scale and identifying an optimal expiration time from said identified intervals based upon applying a threshold T, and
   e. utilizing said identified expiration times corresponding to each of said location positioning modules to identify an expiration time and placing increased confidence in location reports corresponding to said identified expiration time.

2. A method for increasing confidence for tracking information originating from one or more location positioning modules, as per claim 1, wherein said tracked entities communicate via a simple object access protocol (SOAP).

3. A method for increasing confidence for tracking information originating from one or more location positioning modules, as per claim 1, wherein said method reduces required communication bandwidth by inhibiting transmission of location data during said estimated expiration times.

4. An article of manufacture comprising a computer usable medium having computer readable program code embodied therein which increases confidence for tracking information originating from one or more location positioning modules, said article comprising:
   a. computer readable program code receiving location reports from said one or more location positioning modules;

b. computer readable program code storing said location reports in one or more databases;

c. computer readable program code creating N optimal partitions for location reports corresponding to each of said location positioning modules;

d. computer readable program identifying via pattern analysis an expiration time associated with each of said created partitions;

e. computer readable program code utilizing said identified expiration times corresponding to each of said location positioning modules to identify an expiration time and placing increased confidence in location reports corresponding to said identified expiration time;

f. computer readable program code identifying several frequent time intervals between location reports in a cluster using a logarithmic time interval scale; and g. computer readable program code identifying an optimal expiration time from said identified intervals based upon applying a threshold T.

5. A method for estimating the temporal validity of location reports through pattern analysis, said method comprising:

a. identifying a data analysis mode, said data analysis mode being an online mode when immediate analysis of location data needs to be performed, and said data analysis mode being a batch mode when periodic analysis of data needs to be performed;

b. receiving location records from one or more tracked entities and storing said location records in one or more databases;

c. triggering data analysis tasks based upon said identified data analysis mode, said analysis trigger responsible for periodically forwarding, to a classifier, received location data in said batch mode, and said analysis trigger forwarding said received location data onto said classifier in said online mode;

d. clustering and partitioning location data and said classifier, in an online mode, receiving a single location data from a tracked entity and repartitioning already partitioned data in said databases corresponding to said tracked entity and based upon said received location data, and said classifier, in a batch mode, clustering and repartitioning location data in said databases corresponding to a tracked entity upon a request from said analysis trigger, and e. estimating expiration times associated with each of said repartitioned data computed by said classifier, said expiration times providing a measure of the degradation of location reports over a period of time.

6. A method for estimating the temporal validity of location reports through pattern analysis, as per claim 5, wherein said method further comprises the steps of:

a. identifying several frequent time intervals between location reports in a cluster using a logarithmic time interval scale, and b. identifying an optimal expiration time from said identified intervals based upon a threshold.

7. A method for estimating the temporal validity of location reports through pattern analysis, as per claim 1, wherein said tracked entities communicate via a simple object access protocol (SOAP).

8. A method for estimating the temporal validity of location reports through pattern analysis, as per claim 1, wherein said method reduces required communication bandwidth by inhibiting transmission of location data during said estimated expiration times.

9. A computer-based method for providing a measure of degradation associated with location reports over a period of time, said location reports corresponding to one or more tracked entities, said method comprising:

a. setting a counter to point to a first of said tracked entities;

b. identifying and partitioning location reports associated with said first tracked entity into one or more clusters;

identifying several frequent time intervals between location reports in each cluster using a logarithmic time interval analysis;

d. identifying an optimal expiration time associated with each partition via said logarithmic time interval analysis based on a threshold, said optimal expiration time providing a measure of degradation of a location report in a particular partition over a period of time;

e. associating location reports in each partition with corresponding optimal expiration time;

f. incrementing said counter to point to next of said tracked entities and repeating steps b–e exhaustively for remainder of said tracked entities; and g. providing a measure of degradation of a particular location report associated with a particular tracked entity based upon identified optimal expiration time in step d.

10. A method for providing a measure of degradation associated with location reports over a period of time, as per claim 9, wherein said tracked entities communicate via a simple object access protocol (SOAP).

11. A computer-based method for providing a measure of degradation associated with location reports over a period of time, as per claim 9, wherein said method reduces required communication bandwidth by inhibiting transmission of said location reports during said identified optimal expiration time.

12. A system for estimating the temporal validity of location reports through pattern analysis, said system comprising:

a. a mode selector identifying a data analysis mode, said data analysis mode being an online mode when immediate analysis of location data is to be performed, and said data analysis mode being a batch mode when data analysis is triggered either manually or periodically;

b. a receiver receiving location records from one or more tracked entities and storing said location records in one or more databases;

c. an analysis trigger triggering data analysis tasks based upon said identified data analysis mode, said analysis trigger responsible for periodically forwarding to a classifier received location data in said batch mode, and said analysis trigger forwarding said received location data onto said classifier in said online mode;

d. said classifier clustering and partitioning location data, and said classifier, in an online mode, receiving a single location data from a tracked entity and repartitioning already partitioned data in said databases corresponding to said tracked entity and based upon said received location data, and said classifier, in a batch mode, clustering and repartitioning location data in said databases corresponding to a tracked entity upon a request from said analysis trigger, and e. an expiration time analyzer performing pattern analysis and estimating expiration times associated with each of said repartitioned data computed by said classifier, said expiration times providing a measure of the degradation of location reports over a period of time.

13. A system for estimating the temporal validity of location reports through pattern analysis, as per claim 1, wherein said expiration time analyzer further comprises:
   a. a time interval analyzer identifying several frequent time intervals between location reports in a cluster using a logarithmic time interval scale, and
   b. an expiration time extractor identifying an optimal expiration time from said identified intervals based upon a threshold.

14. A system for estimating the temporal validity of location reports through pattern analysis, as per claim 1, wherein said system communicates with said tracked entities via simple object access protocol (SOAP).

15. A system for estimating the temporal validity of location reports through pattern analysis, as per claim 1, wherein said system reduces required communication bandwidth by inhibiting transmission of location data during said estimated expiration times.

* * * * *